Aug. 24, 1954

L. J. KOCI 2,687,469

THERMAL RESPONSIVE CONTROL DEVICE

Filed April 14, 1950

INVENTOR.
Ludvik J. Koci
BY McCanna & Morsbach
Attys.

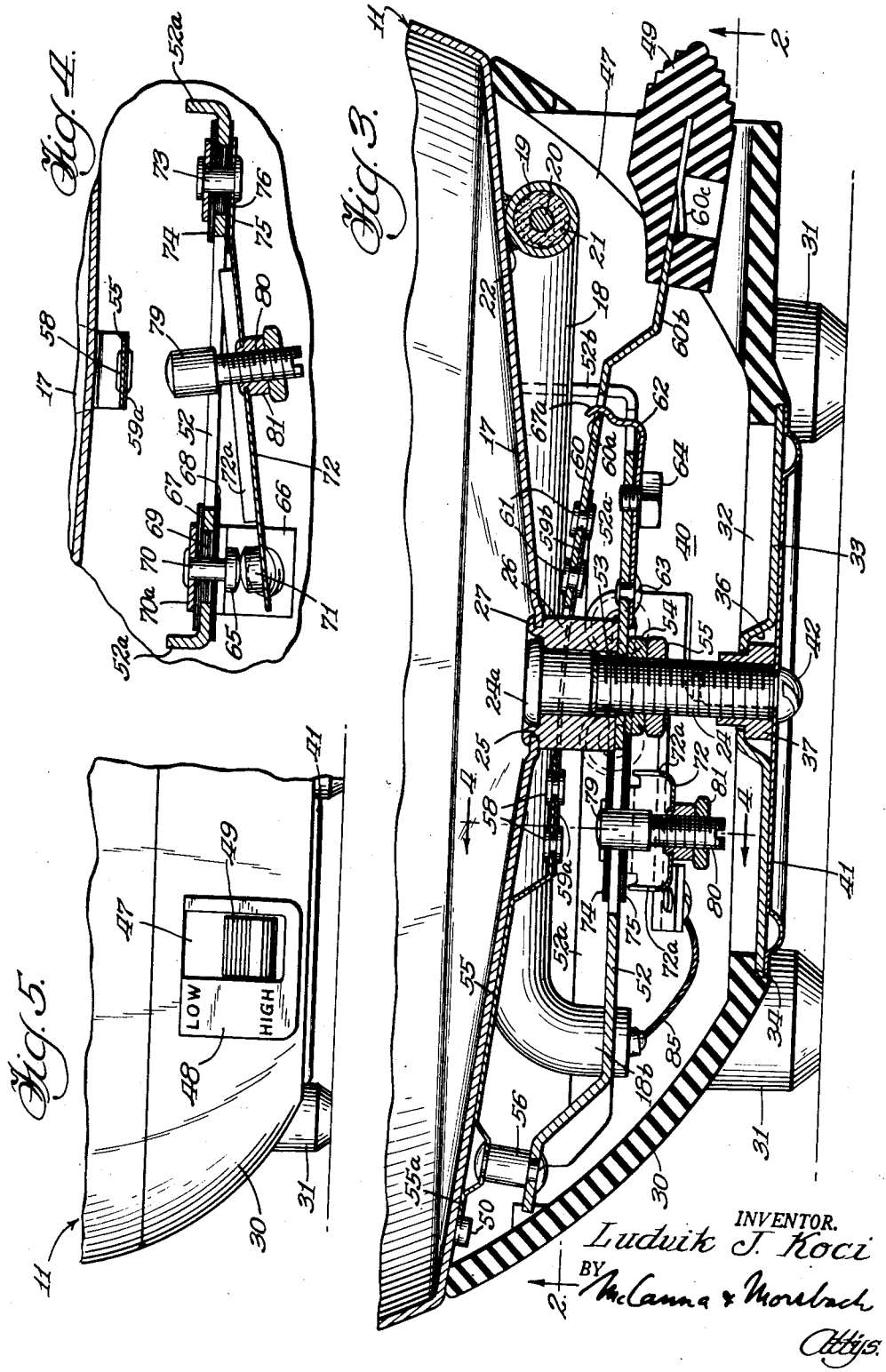

Aug. 24, 1954

L. J. KOCI 2,687,469

THERMAL RESPONSIVE CONTROL DEVICE

Filed April 14, 1950

INVENTOR.
Ludwik J. Koci
BY McKenna & Morebach
Attys.

Patented Aug. 24, 1954

2,687,469

UNITED STATES PATENT OFFICE 2,687,469

THERMAL RESPONSIVE CONTROL DEVICE

Ludvik J. Koci, Brookfield, Ill., assignor to Sunbeam Corporation, Chicago, Ill., a corporation of Illinois Application April 14, 1950, Serial No. 155,981

13 Claims. (Cl. 219—43)

1

The present invention relates to thermal responsive control devices and more particularly to such control devices well adapted for use in automatically controlled cooking devices or heating devices employing electric heating elements.

In cooking devices of the type employing an electric heating element, the current flow through which is controlled by a suitable thermal responsive device, it is usually desirable to control such current flow in a predetermined manner. For example, in an automatic coffee maker of the type disclosed in Jepson Patent 2,312,555, there is disclosed and claimed a coffee maker of the so-called vacuum type which has been very extensively used. In general, this type of coffee maker comprises a lower heating chamber or vessel and an upper coffee infusion chamber or vessel. Conventionally, water is placed in the lower heating chamber while the coffee grounds are placed in the upper chamber. As the water is heated in the lower chamber, water vapor pressure is created above the liquid in this chamber which, when the temperature approaches the boiling point of water, forces the water from the lower chamber into the upper chamber to infuse the coffee grounds contained therein. When the heat is removed from the lower chamber, it cools so that the water vapor contained therein condenses to create a vacuum thereby causing coffee to pass from the upper chamber through a suitable filter into the lower chamber where it preferably is maintained at a desirable serving temperature which could be of the order of 180° F.

During the coffee making operation, the water is initially heated to well over 200° F. After the coffee has been made, however, it is desirable to maintain its temperature at around 180° F., which is considered to be a desirable serving temperature, which serving temperature may be higher or lower, depending upon the taste of the individuals concerned. In some of the early automatic coffee makers, it was common practice to provide two heating elements, one for producing the high heat required during the coffee making operation, and the other to maintain the coffee at a lower serving temperature. Initially, individual control means for each heating element were provided. More recently it was suggested to use a heating element with two independent control devices to control the two temperature ranges thereof. Such an arrangement is disclosed in copending Jepson application, Serial No. 794,959, filed December 31, 1947, now U. S. Patent 2,664,811 granted January 5, 1954 and assigned to the same assignee as the present application. One control device in this copending application is adapted to control the coffee maker

2 during the coffee making operation and particularly during the high heat interval. Subsequently a second control device in the form of a thermal responsive element takes over the control of the heating element to maintain the coffee at the desired temperature for serving. In Jepson Patent 2,312,555 referred to above, there is disclosed and claimed an arrangement whereby a single heating element and a single thermal responsive device are employed in an automatic coffee maker not only to control the coffee making operation during the coffee making cycle when the temperature substantially exceeds 200° F. at a certain stage in the process, but also subsequently to control the coffee maker and maintain the coffee at a suitable temperature for serving. The above mentioned Jepson patent discloses a very satisfactory arrangement including a mechanical device manually set for the high heat condition during the coffee making operation which is automatically operated at the completion of the coffee making operation whereby the single thermal responsive device subsequently operates to maintain the coffee at the desired temperature for serving. The present invention is concerned with an improvement on the thermal control device of the above mentioned Jepson patent, still employing a single heating element of an improved type and a single thermal responsive device, which is simple and compact, may be manufactured as a sub-assembly, and which is fool-proof in operation.

In cooking devices and other heating apparatus, it is sometimes unnecessary to provide a control of the type disclosed above where a single thermostat and a single heating element control energization of the heating element in two temperature ranges. The improved thermal responsive device of the present invention is equally well suited for use in other cooking devices or heating apparatus, even where the two temperature range feature discussed above is not desirable, and an application of the present invention when used for only a single temperature range is disclosed and claimed in copending Jepson application, Serial No. 155,977, filed April 14, 1950, and assigned to the same assignee as the present application. It will be apparent that the thermal responsive device of the present invention must be of unusually simple and inexpensive design so that it can economically be employed in applications such as those just mentioned, while still being useable in applications where control in two temperature ranges is required.

In prior control devices it has been customary to require a substantial force to be moved even with the initial deflection of a thermal responsive element. This sometimes resulted in improper operation, and it would be desirable to provide a thermal responsive control of snap acting type and so arranged as to be independent of the effect of frictional resistance, contact welding, etc.

Accordingly, it is an object of the present invention to provide a new and improved thermal responsive control device particularly well adapted for use with automatically controlled electric cooking devices and heating apparatus.

It is another object of the present invention to provide an improved thermal responsive control device particularly well adapted for use with vacuum type coffee makers whereby a single heating element and a single thermally controlled switch produce a high brewing heat, and thereafter maintain the device at a lower heat to keep the coffee produced in a suitable condition for serving.

It is a further object of the present invention to provide an improved automatic coffee maker having an unusually simple and compact automatic heating control capable of performing the functions required of such a coffee maker.

Still another object of the present invention is to provide an improved sub-assembly of a thermal responsive device adapted for ready association with a coffee maker of the automatic type or similar cooking apparatus to provide control in two temperature ranges with a single heating element and a single thermal responsive switch.

A still further object of the present invention is to provide a thermal responsive control device for an automatic coffee maker or other cooking device which is simple and sturdy in construction, economical to manufacture and which is capable of giving years of satisfactory and foolproof service.

Further objects and advantages of the present invention will become apparent as the following description proceeds and the features of novelty which characterize the invention will be pointed out with particularity in the claims annexed to and forming a part of this specification.

For a better understanding of the present invention, reference may be had to the accompanying drawings in which Fig. 1 is a perspective view of an automatic coffee maker representative of a cooking device with which the present invention is particularly applicable;

Fig. 3 shows the complete structure;

Fig. 3 is an enlarged sectional view taken on line 3—3 of Fig. 2 assuming that Fig. 2 shows the complete structure;

Fig. 4 is a sectional view taken on line 4—4 of Fig. 3, assuming that Fig. 3 shows the complete structure;

Fig. 5 is an enlarged fragmentary view of a portion of the coffee maker of Fig. 1;

Basically, the present invention is concerned with a control device in the form of a sub-assembly comprising a supporting plate having mounted thereon a bimetallic element, which has one end thereof fastened to said plate. The free end of the bimetallic element is connected to a somewhat resilient like member pivotally supported so that the bimetallic element has two more or less stable positions and moves with a snap action between these two positions. In either of these two positions, the bimetallic element is capable of deflecting and performing a control operation, thereby providing automatic control in two different temperature ranges. A suitable switch associated with the bimetallic element is capable of being opened and closed in the extreme positions of the bimetallic element. A manual lever is provided automatically to move the bimetal to what might be termed its high setting. When a sufficiently high temperature is reached, the bimetallic element snaps over into its other position, which may be termed its "low position," and it is in this low control position that operation to maintain constant a certain desired lower temperature is provided. Simple means are included whereby the temperature at which the bimetallic element moves from its high position and also the temperature at which the cooking device is maintained at the low setting, are independently adjustable. By appropriately adjusting the latter, the device may operate solely to open and close a circuit without any low temperature control.

Figure 1:
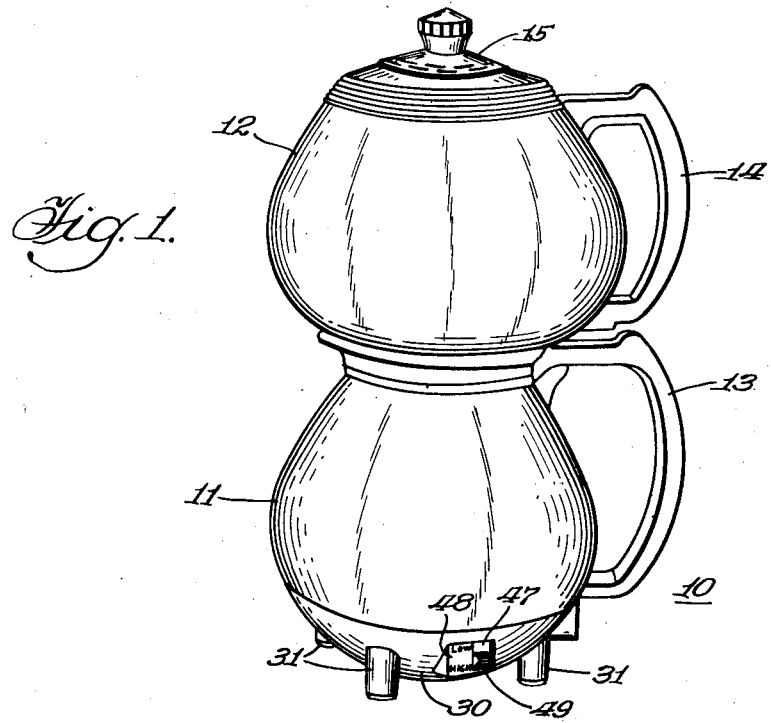

Although the present invention is applicable to control heating devices in general, it is particularly well adapted to control cooking devices such as automatic coffee makers. Solely for the purpose of disclosing the present invention, it has been illustrated as applied to a coffee maker. Referring now to the drawings, there is illustrated in Fig. 1 an automatic coffee maker generally designated at 10 comprising a lower water heating chamber or vessel 11 and an upper coffee infusion vessel or chamber 12. These vessels may be formed of any suitable material such as glass, metal or the like. Preferably, however, the vessels are formed of a suitable metal such as a chromium plated copper or the like and each vessel is provided with a suitable handle designated at 13 and 14 for the vessels 11 and 12 respectively. The lower vessel 11 which is commonly designated as the pot, since it may be used as such, following the removal of the upper vessel at the completion of the coffee making operation, supports the upper vessel 12 in the manner indicated during the coffee making operation. The vessel 12 is adapted to be closed by a suitable cover 15 which may be used with the pot 11 when the latter is used as a conventional coffee pot after the coffee making cycle has been completed.

Figure 2:
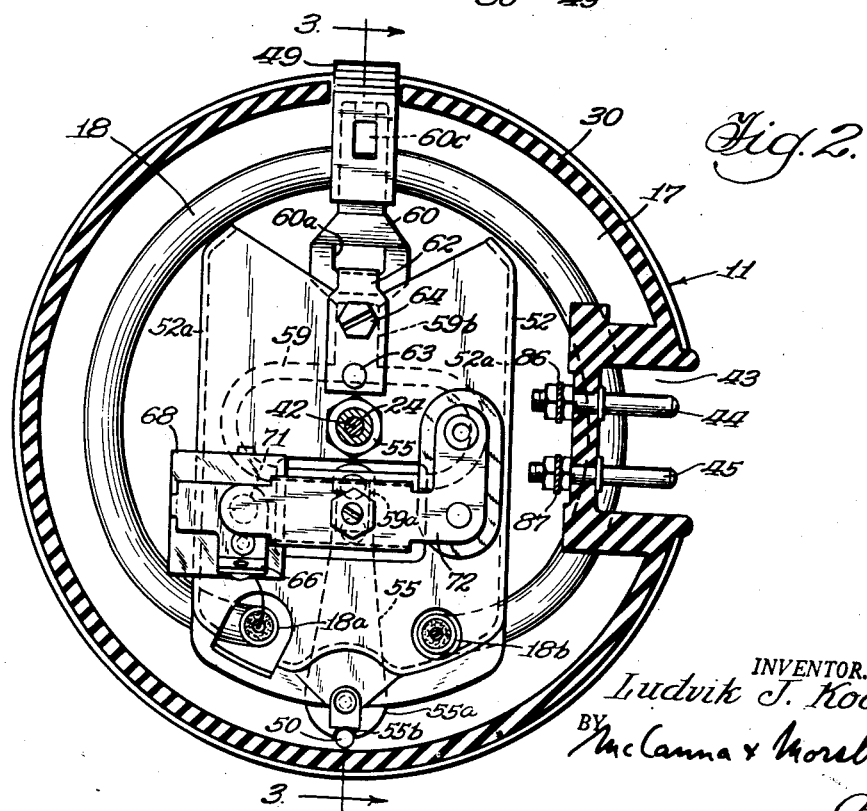
Fig. 2 is a reduced sectional view taken on line 2—2 of Fig. 3, assuming

As in the Jepson Patent 2,312,555 referred to above, the lower vessel or pot 11 is provided with a bottom 17, best shown in Fig. 3 of the drawings, which has a somewhat conical configuration so as to provide a low point at the center of the pot. For the purpose of heating liquid disposed within the lower vessel 11, there is provided a heating element 18 which is in good heat exchange relationship with the under or nonliquid engaging side of the bottom 17 or, in other words, with the side which is effectively outside the pot 11. As illustrated, the heating element 18 is preferably of the well known sheathed form comprising an outer metal sheath 19 within which is disposed a resistance element 20 preferably disposed in the form of a spiral coil and spaced and supported within the sheath 19 by suitable electrical insulating material 21 which also provides a good heat conductor. This material 21 may preferably be fused magnesium oxide or similar material. In accordance with the present invention, the heating element 18 is arranged in a circular configuration as best shown in Fig. 2 of the drawings with the ends or terminals 18a and 18b thereof being closely adjacent and extending into a different plane from the main portion of the heating element 18. With the present invention, only a single turn of sheathed heating element 18 need be employed and to insure uniform heating, the bottom 17 of the vessel 11 is preferably formed of a material having a very high heat conductivity. Sheet copper has been found to be especially satisfactory and preferably the heating element 18 is brazed to the sheet copper bottom 17, as indicated at 22 in Fig. 3 of the drawings. The conductivity of such sheet copper has been found sufficiently good so that fairly uniform heating occurs throughout the entire surface of the bottom 17, even though the heating element 18 is brazed to a relatively small area thereof.

As in the above mentioned Jepson patent, there is provided centrally of the bottom 17 of the pot 11, a supporting stud 24 which extends below the bottom 17 for supporting various portions of the control device of the present invention described in greater detail hereinafter. As illustrated, the bottom 17 of the vessel 11 is provided at its low central point with an opening defined at 25 for receiving a hollow rod 26 of copper or the like, which has an annular flange adapted to be peened over as indicated at 27 so as to embrace the edges of the opening 25 in a manner clearly indicated in Fig. 3 of the drawings. The stud 24 has its head 24a seated in a recess defined at one end of the hollow rod 26. Preferably, the bottom 17, the hollow rod 26 and the stud 24 are intimately united as by brazing or the like to form a leak proof vessel 11 and to rigidly support the stud 24 from the vessel 11 in the manner indicated.

In order to define a control chamber for the automatically controlled cooking device or heating apparatus 10, there is provided a somewhat bowl shaped base 30 preferably formed from a molded insulating plastic and shaped so that when associated with the vessel 11, a pleasing exterior appearance is provided, as clearly indicated in Fig. 1 of the drawings. This base has integrally formed therewith, suitable legs 31 for supporting the pot to provide ventilation below the same. The bottom side of the base is provided with a relatively large central opening 32 adapted to be closed by a suitable closure plate 33 which abuts against an annular shoulder 34 defined around the opening 32. Preferably, the center of the closure plate 33 is provided with an indentation defining a recess 36 to accommodate a nut 37 threadedly engaged with the stud 24 so as not only to hold the closure plate 33 in position, but also to maintain the base 30 in assembled relationship with the vessel 11, thus defining the control chamber 40 for accommodating the control mechanism of the cooking device to be described hereinafter. The closure plate 33 may be provided, if desired, with suitable openings therein to accommodate a screwdriver or other tool when making the necessary adjustments of the thermal responsive control device described hereinafter, and these openings may then be closed by a suitable decorative plate 41 held in place by a screw 42 threaded into the lowermost end of the stud 24.

The molded base 30 preferably also includes integral wall portions defining a recess 43 wherein are disposed the contact pins 44 and 45 which may be suitably connected to a conventional appliance cord, the contact pins 44 and 45 providing bayonet type contacts. The recess 43 is designed to receive the conventional female type plug contact which is preferably connected by means of the conventional appliance cord, not shown, to any suitable electrical outlet. As best shown in Fig. 2 of the drawings, the contact pins 44 and 45 are suitably fastened within openings provided in one of the walls defining the recess 43 and extend therethrough and into the chamber 40 to make electrical connections with the control arrangement, to be described in detail hereinafter, disposed within the base 30. Additionally the base 30 is provided with an opening or slot 47 through which a suitable vertically movable, manually actuable member 49 may extend for manual actuation of the control mechanism. When the present invention is employed to control a device such as the egg cooker disclosed and claimed in copending Jepson application, Serial No. 155,977, filed April 14, 1950, appropriate "on" and "off" indicia will be provided upon the base 30 adjacent the opening 47. Where the cooking device is such as to require control in two temperature ranges, appropriate indicia indicating the high or low setting of the device is provided. As best shown in Fig. 5 of the drawings, the base 30 is provided with a raised surface 48 adjacent the opening 47 on which appropriate indicia such as "low" and "high" is provided to indicate the setting of the manually actuable member 49 disposed in the opening 47.

The vessel 11 includes one additional element not described heretofore, comprising the stud or pin 50, suitably welded or integrally formed with the bottom 17, and disposed adjacent the periphery of the vessel 11 and more or less mid-way between the ends or terminals 18a and 18b of the heating element 18.

In accordance with the present invention, the control mechanism for controlling the supply of electrical energy to the electric heating element 18 comprises a sub-assembly which is supported from the stud 24 and may readily be assembled or removed from stud 24 as a unit. As illustrated, this sub-assembly comprises a main supporting plate 52 having turned up edge flanges 52a along the sides thereof to provide increased rigidity. As illustrated, in Fig. 2 of the drawings the main supporting plate 52 has a configuration somewhat of the shape of the tail of an arrow, although it will be understood that the particular shape employed is immaterial. The supporting plate 52 is provided with a central opening 53 through which the stud 24 may extend when the plate is assembled with the cooking vessel with which it is associated. As illustrated in the drawings, the plate 52 is adapted to have one side thereof engage the copper rod 26 whereupon suitable nuts 54 and 55 may be applied to the stud 24 as indicated in Fig. 3 of the drawings to maintain the plate in proper assembled relationship. Preferably, the plate 52 is provided at one end with a pair of legs 52b comprising an integral part of the plate which engage the bottom 17 of the vessel 11 to provide spaced supports for this end of the plate 52.

For the purpose of providing temperature control, the sub-assembly includes a bimetallic element 55 which has one end thereof attached to the end of plate 52 remote from the legs 52b as by means of a spacing rivet 56. The spacing rivet 56 provides such a spacing that at normal temperatures when the plate 52 is assembled to the stud 24, a substantial portion of the bimetallic element 55 lies against and in intimate heat exchange relationship with the bottom 17. This provides a marked advantage over prior art devices where it was customary to transfer heat to the bimetallic element through a suitable contact stud or the like with the inherent problem of having poor heat transfer, where the stud was welded or brazed to the heated device. By having the bimetal 55 inherently biased against the bottom 17, good heat transfer with the very surface which it is desired to control, is assured.

With the arrangement described thus far, the sub-assembly comprising the main supporting plate 52 is held in place by a single central fastening means and there is some danger of movement or rotation of the plate 52 about the axis of the stud 24. To prevent this, the bimetal 55 has a portion 55a extending slightly beyond the rivet 56 which portion includes a notch 55b for receiving therein the stud 50 welded or otherwise secured to the bottom 17 of the vessel 11. It will be apparent at once that this firmly secures the sub-assembly comprising the main plate 52 in position since it positively eliminates any rotation thereof about the axis of the stud 24. The high expansion side of the bimetal 55 is in contact with the bottom 17 under low temperature conditions so that upon heating of the bottom 17, the bimetal 55 tends to have its free end move away from the bottom 17.

In order that the bimetal 55 may operate with a snap action to perform the control functions described in detail hereinafter, the free end of the bimetal is connected as by suitable rivets, or other fastening means such as 58, with an extension 59a of resilient spring member 59 illustrated in the shape of a flat disk of oval configuration. The extension 59a is on one side of the oval and a similar extension 59b is provided on the other side of the oval which is connected to the one end of a suitable lever 60 by suitable means such as rivets 61. The lever 60 at an intermediate point thereof is pivotally mounted to an L-shaped support 62 suitably secured as indicated at 63 to the supporting plate 52. The pivotal support of the lever 60 is accomplished by virtue of an opening 60a defined in this lever which engages with a hook-shaped extension 62a of the pivotal support 62. The pivotal support 62 furthermore may be adjusted by virtue of an adjusting screw 64 so as to control the compressive force applied across the ends of the snap acting assembly comprising the bimetal 55, the resilient member 59 and the portion of lever 60 between the resilient member 59 and the pivotal support 62. It will be noted from an examination of Fig. 3 of the drawings that the L-shaped support 62 is formed of resilient material and by virtue of the compressive force of the snap acting assembly tends to have the leg thereof fastened by the rivet 63 moved away from the support 52 in dependence upon the adjustment of the screw 64. As the screw 64 clamps the riveted leg of the pivotal support 62 closer against the support 52, the compressive force applied to the snap acting assembly is increased. It should be understood that although the resilient member 59 is described as an oval disk, actually it may have any suitable configuration. The reason a somewhat oval shaped disk member is employed, is two fold. First, it was found to give the desired longitudinal softness to the snap acting assembly to provide a substantial range of movement of the snap acting device. Secondly, such an oval member readily accommodates the supporting stud 24 which, as may be noted, is disposed within the oval.

Figure 7:
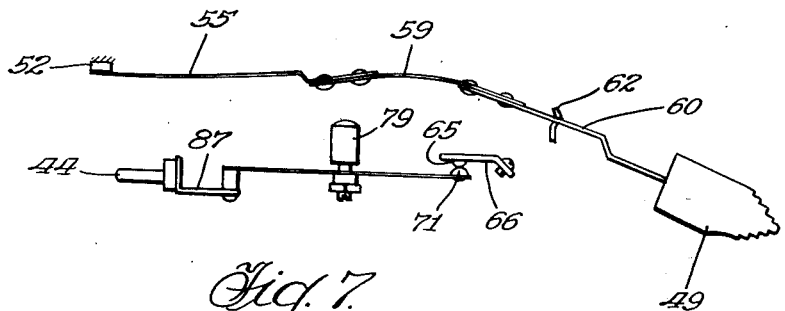
Fig. 7 is a somewhat schematic view of the thermal responsive device of the present invention shown in the "high" heat position thereof.
Figure 8:
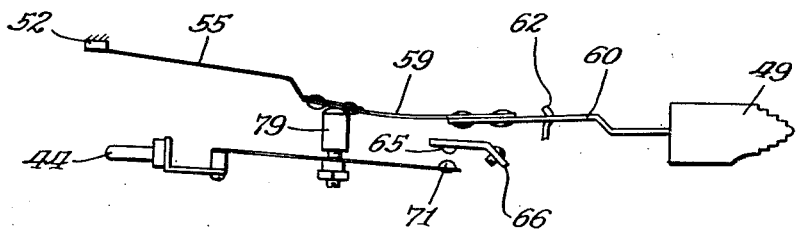
Fig. 8 is a view similar to Fig. 7 with the thermal responsive device shown in the "low" heat position thereof.

As the compressive force applied across the snap acting assembly is decreased sufficiently, the bimetal will tend to remain against the bottom 17 of the vessel 11, and if it is moved to a position away from the bottom, it will always tend to snap back against the bottom while at room temperature. On the other hand, when a sufficient compressive force is applied across the ends of the snap acting assembly including the bimetal and the resilient member 59, a large range of snap acting movement is obtained and the bimetallic element 55 will assume two stable positions, one as shown in Fig. 7 and one as shown in Fig. 8 of the drawings. Movement from the Fig. 7 to the Fig. 8 position is occasioned through heating of the bimetal 55, while movement in the other direction requires manual actuation. In order to accomplish such manual resetting, the lever 60 is provided with an extension 60b which extends through the opening 47 described above and has attached thereto the manual actuating knob 49. Preferably the extension 60b is provided with a deformed portion such as 60c which permits ready assembly with knob 49 but prevents disassembly.

By properly adjusting the pivotal support 62 through manipulation of the adjusting screw 64, the temperature at which the bimetal 55 moves from the position shown in Fig. 7 to the position shown in Fig. 8 may properly be adjusted. For use with a coffee maker, it is desirable that this temperature be somewhat above 200° F. such as, for example, 240° F. to insure that all the liquid has moved to the upper vessel 12. When this has occurred it is only desirable to control the heating element 18 to maintain the coffee at the proper temperature for serving.

In order to control the electrical circuit including the heating element 18, there is supported on the sub-assembly including the plate 52, an electrical switch comprising a stationary contact 65 suitably attached to a stationary contact arm 66 which is supported in insulated relationship by insulating means 67, 68 and 69 from the support 52 as by a rivet 70 and clamping plate 70a. The switch further includes a movable contact 71 supported on a resilient contact arm 72 which is illustrated as having an L-shaped configuration as best shown in Fig. 2 of the drawings. The end of the contact arm 72 supporting the contact 71 is free to move, whereas the other end is fastened as by a rivet 73, to supporting plate 52 but is insulated therefrom by suitable insulating means 74, 75 and 76. The relative movement between the contacts 65 and 71 is produced through bending of the resilient contact arm 72.

Movement of contact arm 72 is produced in response to deflection of the bimetal 55 by virtue of an insulating extension 79 adjustably supported from the resilient arm 72 as best indicated in Fig. 4 of the drawings. This insulating member 79 is disposed in the path of movement of the moveable end of the thermal responsive element 55 so as to be struck during the snap acting movement from the position shown in Fig. 7 of the drawings to the position shown in Fig. 8 of the drawings. In order to control the temperature at which the contacts 65 and 71 are opened and closed when the bimetal or thermostat 55 has moved to the position shown in Fig. 8 of the drawings, the extension 79 is preferably adjustably supported on the arm 72 as by a threaded adjusting screw 80 threadedly mounted in a nut 81 suitably supported on the arm 72. It will be understood that it is desirable for the arm 72 to be relatively rigid in its intermediate portion to insure uniform operation and to this extent the resilient arm 72 is preferably provided with side flanges 72a adjacent its intermediate portion. It will be understood also that if desired, the stop member 79 may be non-adjustable and instead, the contact 71 or the contact 65 may be adjustable to perform the same function. Thus, it will be apparent that adjustment of the operating temperature in the high range of operation is controlled by the adjusting screw 64 while adjustment of the temperature to be maintained in the low range is controlled by the adjusting screw 80.

Figure 6:
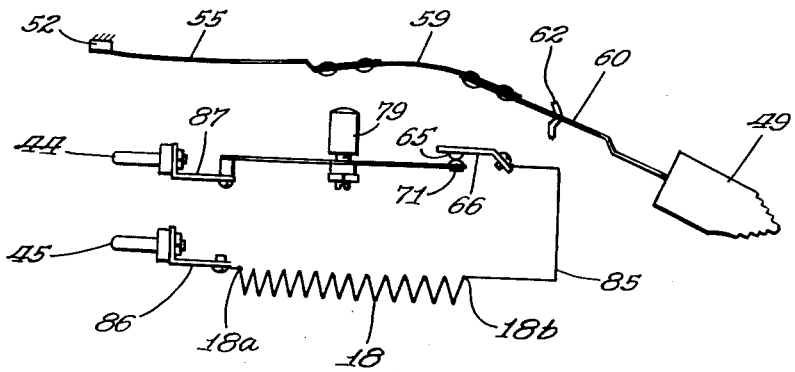
Fig. 6 is a somewhat schematic diagram illustrating the electrical connections of a cooking device embodying the present invention with the electric heating element shown in its energized condition.

For the purpose of completing the electrical circuit through the switch comprising the contacts 65 and 71 and the heating element 18, the stationary contact arm 66 is electrically connected by means of a conductor 85 directly to the terminal 18b of the heating element 18. The other terminal of the heating element 18 is connected by means of a conductor 86, which may be a flat ribbon conductor, with the terminal pin 45. The other terminal pin 44 is connected by means of a ribbon conductor 87 with the resilient contact arm 72 which latter may be provided with suitable terminal means to facilitate the ready interconnection. The electrical circuit can readily be ascertained from an examination of Fig. 6 of the drawings where the elements are schematically indicated and are designated by the same reference numerals as in the structural views of the device.

In view of the detailed description included above, the operation of the control device of the present invention will readily be understood by those skilled in the art. First of all, the entire control device is in the form of a subassembly mounted on a supporting plate 52 which is attached to the cooking device in a simple manner. When the device of the present invention is used to control two temperatures, such as the brewing temperature of an automatic coffee maker, and subsequently a low serving temperature, the manual control button 49 is moved to the high position as shown in Fig. 3 of the drawings when it is desired to initiate the coffee making operation. This, of course, insures closure of the switch at the contact 65 and 71. By appropriate adjustment of the adjusting screw 64, the contacts will remain closed until a relatively high temperature is reached, such as a temperature of the order of 240° F. All this time the bimetal 55 will have been heated to such an extent that deflection occurs and when a sufficient force has developed, the bimetal will snap over from the position shown in Fig. 7 of the drawings, to the position shown in Fig. 8, whereupon control in the low temperature range will result. Since the bimetal 55 is at an elevated temperature immediately following snap acting movement from the high to the low setting, the contacts 65 and 71 will remain separated until sufficient cooling of the vessel 11 occurs to drop the temperature to that for which the adjusting screw 80 has been set and, thereafter, the bimetallic element 55 will cause the contacts of the control switch to be alternately opened and closed to maintain this lower temperature. The high temperature operation will not again occur until the manual button 49 is restored to the high setting. This construction provides a very satisfactory arrangement in that no force for causing opening of the contacts is encountered by the bimetallic element 55 until it moves with a snap action whereby it has sufficient force to open the contacts. In prior art arrangements, even the initial movement of the bimetallic element was opposed by the friction of the contacts to be operated and the friction of associated parts, and this high friction oftentimes caused unsatisfactory operation.

In the event that the control device of the present invention is used only in one range, such as the high temperature range, the adjustment of the stop 79 is such that under normal conditions, the bimetallic element 55 will never be cooled sufficiently to permit reclosing of the circuit at the contacts 65 and 71, unless the bimetallic element 55 is moved back to its initial position. This means, of course, that the adjusting screw 80 is so adjusted that for any deflection of the bimetallic element 55, while in the Fig. 8 position of the drawings, the contacts 65 and 71 remain separated.

While there has been shown and described certain particular embodiments of the present invention, it will be understood that various changes and modifications of the invention will occur to those skilled in the art. It is aimed in the appended claims to cover all such changes and modifications as fall within the true spirit and scope of the present invention.

What is claimed as new and desired to be secured by Letters Patent of the United States is:

1. Thermal control means for a cooking device of the type including an electric heating unit and thermal responsive switch means for controlling the flow of current to said heating unit, said thermal responsive switch means including a bimetallic element having one end thereof supported from said cooking device and in heat exchange relationship therewith, said switch means including a resilient element incorporated in a snap acting over center mechanism whereby said resilient element assumes two relatively spaced positions, means responsive to a predetermined movement of said bimetallic element in response to the attainment of a predetermined high temperature of said cooking device for causing said resilient element to assume one of said two positions and said switch means to interrupt current flowing to said heating unit, manually actuable means operable on said resilient element for causing said resilient element to assume the other of said two positions, and means including said bimetallic element for alternately opening and closing the circuit controlled by said switch means while said resilient element is in said one of said two positions to maintain constant the temperature of said cooking device at a temperature below said predetermined high temperature.

2. In a cooking device of the type including an electric heating unit and a pair of relatively movable contacts for controlling the flow of current to said heating unit, thermal control means comprising a sub-assembly including a supporting plate for said contacts, a bimetallic element having one end thereof supported on said plate, resilient means pivotally mounted on said plate and connected to the other end of said bimetallic element to provide a snap acting over center mechanism whereby the other end of said element may assume two relatively widely spaced stable positions, means responsive to movement of said bimetallic element to said one of said positions in response to the attainment of a predetermined temperature of said cooking device for producing relative separation of said contacts, manual means for moving said element to the other of said positions to close said contacts and means for supporting said plate from said cooking device with said bimetallic element in direct intimate heat exchange relationship with said cookmate heat exchange relationship with said cooking device over a substantial length of the movable portion of said bimetallic element when in one of said two spaced positions thereof.

3. Thermal control means for a cooking device of the type including an electric heating unit and a pair of relatively movable contacts for controlling the flow of current to said heating unit, said thermal control means comprising a bimetallic element having one end thereof supported from said cooking device, resilient means connected to the other end of said bimetallic element and pivotally mounted in spaced relation to said and pivotally mounted in spaced relation to said other end of said element for maintaining said element under compression to provide a snap acting over central mechanism whereby said other end of said element may assume two relatively widely spaced stable positions one of said positions being in direct maximum intimate heat exchange relationship with said device and the other being in less intimate heat exchange relationship with said device, means responsive to movement of said bimetallic element to the other of said positions in response to the attainment of a predetermined high temperature of said cooking device for producing relative separation of said contacts, means connected to said pivotally mounted means for manually returning said element to said one position, and means including said element for alternately opening and closing said contacts while said element is in said other of said positions to maintain constant the temperature of said cooking device at a temperature below said predetermined high temperature.

4. A thermal control means for a cooking device of the type including an electric heater and a pair of relatively movable contacts for controlling the flow of current to said heater, said thermal control means comprising a sub-assembly including a supporting plate for said contacts, a bimetallic element having one end thereof supported on said plate, a closed loop of flat resilient material having one edge pivotally mounted on said plate and the other edge connected to the other end of said element, means for applying a longitudinal compressive stress to said element and across said loop to provide a snap acting over center mechanism whereby the other end of said element may assume two relatively widely spaced stable positions, means responsive to movement of said bimetallic element to one of said positions for producing relative separation of said contacts, and means for mounting said supporting plate from said cooking device with said bimetallic element in intimate heat exchange relationship therewith when in at least one of said two widely spaced positions thereof.

5. A thermal control means for a cooking device of the type including an electric heater and a pair of relatively movable contacts for controlling the flow of current to said heater, said thermal control means comprising a sub-assembly including a supporting plate for said contacts, a bimetallic element having one end thereof supported on said plate, means pivotally mounted on said plate and connected to the other end of said bimetallic element comprising a closed loop of flat resilient material, means for applying a longitudinal compressive stress to said element to provide a snap acting over center mechanism whereby the other end of said element may assume two relatively widely spaced stable positions, said compressive stress being applied across diametrically opposed points on said loop which provides longitudinal softness to said over center mechanism, means responsive to movement of said bimetallic element to one of said positions for producing relative separation of said contacts, and means for mounting said supporting plate from said cooking device with said bimetallic element in intimate heat exchange relationship therewith when in said one of said two widely spaced positions thereof.

6. For use with a cooking device of the type including an electric heater and a pair of relatively movable contacts for controlling the flow of current to said heater, a thermal control means comprising, a sub-assembly including a supporting plate for said contacts, a bimetallic element having one end thereof supported on said plate, means including a closed loop of flat resilient material for pivotally relating the other end of said element to said plate, means for applying a compressive force longitudinally of said element to provide a snap acting over center mechanism whereby the other end of said element may assume two relatively widely spaced stable positions, means responsive to movement of said bimetallic element to one of said positions for producing relative separation of said contacts, means for mounting said supporting plate on said cooking device with said bimetallic element in intimate heat exchange relationship therewith when in the other of said two widely spaced positions thereof whereby said element moves to said one position in response to a predetermined high temperature of said device, and means for controlling said contacts when said element is in said one of said positions to maintain said cooking device at a relatively constant temperature below said predetermined high temperature.

7. A temperature control arrangement for an electric heating device comprising a thermostat bar having one end fixed and its other end movable in response to changes in temperature, a resilient member fastened to the movable end of said bar, means for applying a compressive force longitudinally of said bar and across said resilient member to cause said bar to move quickly from a first position to a second position, means for adjusting said compressive force to vary the temperature at which said bar moves from said first position to said second position, switch means capable of being actuated in response to said quick movement of said bar from said first position, and means including said element for alternately opening and closing said switch means while said bar is in said second position to maintain the temperature produced by said heating device at a constant value below the temperature at which said bar moves from said first position.

8. A temperature control arrangement for an electric heating device comprising a thermostat bar having one end fixed and its other end movable in response to changes in temperature, a resilient member in the form of a closed loop of flat, resilient material fastened to the movable end of said bar, means for applying a compressive force longitudinally of said bar and across said resilient member to cause said bar to move quickly from a first position to a second position, means for adjusting said compressive force to vary the temperature at which said bar moves from said first position to said second position, normally closed switch means for controlling the flow of current to said heating device, means actuable upon a predetermined free quick movement of said bar from said first position to cause opening of said switch means, and means for adjusting the operation of said last mentioned means whereby said bar while in said second position controls said switch means to maintain the temperature produced by said heating device at a level below the temperature at which said bar moves from said first position.

9. Thermal control means for a cooking device of the type including an electric heating unit and thermal responsive switch means for controlling the flow of current to said heating unit, said switch means including a bimetallic element having one end thereof supported from said cooking device, resilient means engaging the free end of said element for applying a longitudinal compressive force thereto to provide a snap acting over center mechanism whereby a portion of said switch means assumes two relatively widely spaced stable positions, means responsive to movement of said bimetallic element in response to the attainment of a predetermined high temperature of said cooking device for causing said portion of said switch means to assume one of said two stable positions and produce opening movement of said switch means to interrupt the current flowing to said heating unit, manually actuable means operable on said switch means for manually returning said portion to the other of said two stable positions, and means including said element for alternately opening and closing said switch means while said element is in said one of said positions to maintain constant the temperature of said cooking device at a temperature below said predetermined high temperature.

10. A temperature control arrangement for an electric heating device comprising thermostat means having one end fixed and its other end movable in response to changes in temperature, switch means, a resilient member fastened to one of said means, means for applying a compressive force across said one of said means and said resilient member to cause said one of said means to move quickly from a first position to a second position, upon a predetermined movement of said other end of said thermostat means, means for adjusting said compressive force to vary the temperature at which said one means moves from said first position to said second position, and means including said thermostat means for alternately opening and closing said switch means while said element is in said second position to maintain the temperature produced by said heating device at a constant value below the temperature at which said one of said means moves from said first position.

11. A thermal control means for an electric heating device of the type including an electric heating unit and a pair of relatively movable contacts for controlling the flow of current to said heating unit, said thermal control means comprising a bimetallic element having one end thereof supported from said heating device, resilient means connected to the other end of said bimetallic element and pivotally mounted in spaced relation to said other end of said element for maintaining said element under compression to provide a snap acting over center mechanism whereby said other end of said element may assume two spaced relatively stable positions, said bimetallic element being in direct and intimate heat exchange relationship with said heating device in one of said stable positions over a major portion of its length and being out of intimate heat exchange relationship with said heating device over said major portion of its length in the other of its positions, means responsive to movement of said bimetallic element to said other of said positions in response to the attainment of a predetermined high temperature of said cooking device for producing relative separation of said contacts, and means for manually returning said element from said other position to said one position.

12. The control means set forth in claim 11 in which said resilient means comprises a closed loop of flat resilient material.

13. Thermal control means for a cooking device of the type including an electric heating unit and thermal responsive switch means for controlling the flow of current to said heating unit, said thermal responsive switch means including a bimetallic element having one end thereof in heat exchange relationship with said cooking device, said switch means including a resilient element incorporated in a snap acting over center mechanism whereby said resilient element assumes two relatively spaced positions, means responsive to a predetermined movement of said bimetallic element in response to the attainment of a predetermined high temperature of said cooking device for causing said resilient element to move from one of said two positions to the other of said two positions and said switch means to interrupt current flowing to said heating unit, and means including said bimetallic element for alternately opening and closing the circuit controlled by said switch means while said resilient element is in the other of said two positions to maintain constant the temperature of said cooking device at a temperature below said predetermined high temperature.

References Cited in the file of this patent

UNITED STATES PATENTS

| Number | Name | Date |
| --- | --- | --- |
| 1,448,240 | Spencer | Mar. 13, 1923 |
| 1,743,073 | Simmons | Jan. 7, 1930 |
| 1,809,305 | Matthews | June 9, 1931 |
| 2,137,073 | Bletz | Nov. 15, 1938 |
| 2,141,775 | Varley | Dec. 27, 1938 |
| 2,262,355 | Clark | Nov. 11, 1941 |
| 2,281,319 | Newell | Apr. 28, 1942 |
| 2,312,555 | Jepson | Mar. 2, 1943 |
| 2,313,969 | Riche | Mar. 16, 1943 |
| 2,399,406 | Toth | Apr. 30, 1946 |
| 2,504,728 | Purpura | Apr. 18, 1950 |
| 2,552,420 | Frankel | May 8, 1951 |

FOREIGN PATENTS

| Number | Country | Date |
| --- | --- | --- |
| 624,587 | Great Britain | June 13, 1949 |